United States Patent Office 3,849,467
Patented Nov. 19, 1974

3,849,467
SUBSTITUTED O-(AMINOSULFONYL)-GLYCOLIC ANILIDES
Dietrich Mangold, Neckargemuend, Adolf Fischer, Mutterstadt, and Wolfgang Rohr and Gerhard Hamprecht, Mannheim, Germany, assignors to BASF Aktiengesellschaft, Ludwigshafen (Rhine), Germany
No Drawing. Filed Feb. 21, 1974, Ser. No. 444,302
Claims priority, application Germany, Mar. 3, 1973,
P 23 10 757.5
Int. Cl. C07c 143/68
U.S. Cl. 264—456 A        26 Claims

ABSTRACT OF THE DISCLOSURE

New and valuable substituted O-(aminosulfonyl)-glycolic anilides, herbicides containing these compounds and a process for controlling the growth of unwanted plants with these compounds.

This invention relates to new and valuable substituted O-(aminosulfonyl)-glycolic anilides, herbicides containing these compounds and a process for controlling the growth of unwanted plants with these compounds.

It is known to use chloroacetic N-isopropylanilide as a herbicide (German Patent 1,014,380). However, its action is unsatisfactory.

We have now found that substituted O-(aminosulfonyl)-glycolic anilides of the formula

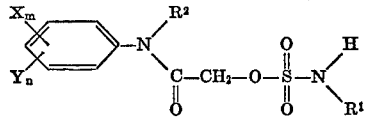

where $R^1$ denotes hydrogen, alkyl, haloalkyl of 1 to 6 carbon atoms or cycloalkyl, $R^2$ denotes alkyl of 1 to 6 carbon atoms, cycloalkyl, cycloalkenyl, alkenyl, alkynyl or substituted or unsubstituted benzyl, X and Y each denote alkyl, alkoxy, haloalkyl of 1 to 6 carbon atoms or halogen, X additionally denotes hydrogen, and $m$ and $n$ each denote one of the integers 1, 2 and 3, have a better herbicidal action.

Examples of meanings for $R^1$ are: methyl, ethyl 2-chloroethyl, 2-fluoroethyl, propyl, isopropyl, 1-chloropropyl-2, 1-fluoropropyl-2, butyl, isobutyl, sec-butyl, 2-chloro-2-methylpropyl-3, 2-fluoro-2-methylpropyl-3, 2-chlorobutyl-3, 2-fluorobutyl-3, pentyl, 2-methylbutyl-3, diethylmethyl, cyclopentyl, hexyl, cyclohexy, 2-methylpentyl-3, 3-methylpentyl-4, 2-methylpentyl-4, heptyl, 5-methylheptyl-6.

Examples of meanings for $R^2$ are: methyl, ethyl, propyl, isopropyl, butyl, isobutyl, sec-butyl, tert-butyl, pentyl, cyclopentyl, hexyl, cyclohexyl, allyl, butenyl, pentenyl, hexenyl, cyclohexenyl, propargyl, butynyl, pentynyl, hexynyl, benzyl.

Examples of meanings for X and Y are: methyl, ethyl, propyl, isopropyl, butyl, isobutyl, sec-butyl, tert-butyl, methoxy, ethoxy, fluoro, chloro, bromo, iodo, trifluoromethyl.

In accordance with the definitions given above, the new glycolic acid derivatives may for instance be derived from N-methyl-, N-ethyl-, N-propyl-, N-isopropyl-, N-butyl-, N-isobutyl-, N-sec-butyl-, N-tert-butyl-, N-allyl-, N-propargyl-, N-butynynl-, N-pentyl-, N-cyclopentyl-, N-hexyl-, N-cyclohexyl-, N-pentynyl-, N-hexynyl- and N-benzylanilines substituted in ortho and/or meta and/or para position by methyl, ethyl, propyl, isopropyl, butyl, isobutyl, sec-butyl or trifluoromethyl.

The new O-(aminosulfonyl)-glycolic anilides may be prepared by reaction of a substituted glycolic anilide with an aminosulfonyl halide in the presence of an acid acceptor, e.g., triethylamine or pyridine.

EXAMPLE 1

O-(isopropylaminosulfonyl)-glycolic acid-N-ethyl-m-toluidide

At 0° to 5° C. and while stirring, a solution of 17.4 parts by weight of N-isopropylaminosulfonyl chloride in 26 parts by weight of dichloromethane is added to a solution of 19.3 parts by weight of glycolic acid-N-methyl-m-toluidide and 12.2 parts by weight of triethylamine in 132 parts by weight of dichloromethane. After 60 minutes the mixture is washed successively with dilute hydrochloric acid, water, sodium bicarbonate solution and again with water, and dried with magnesium sulfate. The organic phase is concentrated in vacuo. A residue remains which crystallizes upon treatment with ether. The melting point of a sample recrystallized from a mixture of ligroin and ether is 65° to 66° C.

The compound has the following structural formula:

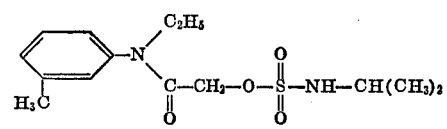

The compounds listed below are prepared analogously:

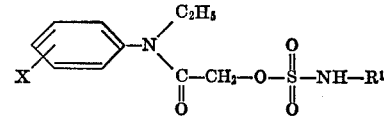

| $R^1$ | X | M.P. (° C.) |
|---|---|---|
| H | 3-CH₃ | |
| CH₃ | 3-CH₃ | 95 to 97. |
| C₂H₅ | 3-CH₃ | 79 to 80. |
| C₃H₇ | 3-CH₃ | 76 to 77. |
| i-C₃H₇ | 3-CH₃ | 65 to 66. |
| n-C₄H₉ | 3-CH₃ | |
| i-C₄H₉ | 3-CH₃ | |
| sec-C₄H₉ | 3-CH₃ | |
| C₅H₁₁ | 3-CH₃ | |
| C₆H₁₃ | 3-CH₃ | |
| Cyclopentyl | 3-CH₃ | |
| Cyclohexyl | 3-CH₃ | |
| 2-chloroethyl | 3-CH₃ | |
| H | 4-CH₃ | |
| CH₃ | 4-CH₃ | |
| C₂H₅ | 4-CH₃ | |
| C₃H₇ | 4-CH₃ | |
| i-C₃H₇ | 4-CH₃ | 75 to 76. |
| C₄H₉ | 4-CH₃ | |
| i-C₄H₉ | 4-CH₃ | |
| sec-C₄H₉ | 4-CH₃ | |
| C₅H₁₁ | 4-CH₃ | |
| C₆H₁₃ | 4-CH₃ | |
| Cyclopentyl | 4-CH₃ | |
| Cyclohexyl | 4-CH₃ | |
| 2-chloroethyl | 4-CH₃ | |
| H | 2-CH₃ | |
| CH₃ | 2-CH₃ | |
| C₂H₅ | 2-CH₃ | |
| C₃H₇ | 2-CH₃ | |
| i-C₃H₇ | 2-CH₃ | |
| C₄H₉ | 2-CH₃ | |
| i-C₄H₉ | 2-CH₃ | |
| sec-C₄H₉ | 2-CH₃ | |
| C₅H₁₁ | 2-CH₃ | |
| C₆H₁₃ | 2-CH₃ | |
| Cyclopentyl | 2-CH₃ | |
| Cyclohexyl | 2-CH₃ | |
| 2-chloroethyl | 2-CH₃ | |

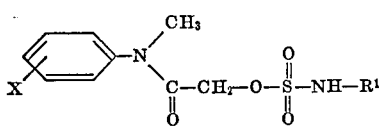

| R¹ | X | M.P. (°C.) |
|---|---|---|
| H | 2-CH₃ | |
| CH₃ | 2-CH₃ | |
| C₂H₅ | 2-CH₃ | |
| C₃H₇ | 2-CH₃ | |
| i-C₃H₇ | 2-CH₃ | |
| C₄H₉ | 2-CH₃ | |
| i-C₄H₉ | 2-CH₃ | |
| sec-C₄H₉ | 2-CH₃ | |
| C₅H₁₁ | 2-CH₃ | |
| C₆H₁₃ | 2-CH₃ | |
| Cyclopentyl | 2-CH₃ | |
| Cyclohexyl | 2-CH₃ | |
| 2-chloroethyl | 2-CH₃ | |
| H | 3-CH₃ | |
| CH₃ | 3-CH₃ | |
| C₂H₅ | 3-CH₃ | |
| C₃H₇ | 3-CH₃ | |
| i-C₃H₇ | 3-CH₃ | |
| C₄H₉ | 3-CH₃ | |
| i-C₄H₉ | 3-CH₃ | |
| sec-C₄H₉ | 3-CH₃ | |
| C₅H₁₁ | 3-CH₃ | |
| C₆H₁₃ | 3-CH₃ | |
| Cyclopentyl | 3-CH₃ | |
| Cyclohexyl | 3-CH₃ | |
| 2-chloroethyl | 3-CH₃ | |
| H | 4-CH₃ | |
| CH₃ | 4-CH₃ | |
| C₂H₅ | 4-CH₃ | |
| C₃H₇ | 4-CH₃ | |
| i-C₃H₇ | 4-CH₃ | |
| C₄H₉ | 4-CH₃ | |
| i-C₄H₉ | 4-CH₃ | |
| sec-C₄H₉ | 4-CH₃ | |
| C₅H₁₁ | 4-CH₃ | |
| C₆H₁₃ | 4-CH₃ | |
| Cyclopentyl | 4-CH₃ | |
| Cyclohexyl | 4-CH₃ | |
| 2-chloroethyl | 4-CH₃ | |

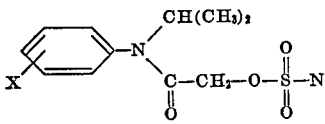

| R¹ | X | M.P. (°C.) |
|---|---|---|
| H | 2-CH₃ | |
| CH₃ | 2-CH₃ | |
| C₂H₅ | 2-CH₃ | |
| C₃H₇ | 2-CH₃ | |
| i-C₃H₇ | 2-CH₃ | |
| C₄H₉ | 2-CH₃ | |
| i-C₄H₉ | 2-CH₃ | |
| sec-C₄H₉ | 2-CH₃ | |
| C₅H₁₁ | 2-CH₃ | |
| C₆H₁₃ | 2-CH₃ | |
| Cyclopentyl | 2-CH₃ | |
| Cyclohexyl | 2-CH₃ | |
| 2-chloroethyl | 2-CH₃ | |
| H | 3-CH₃ | |
| CH₃ | 3-CH₃ | |
| C₂H₅ | 3-CH₃ | |
| C₃H₇ | 3-CH₃ | |
| i-C₃H₇ | 3-CH₃ | |
| C₄H₉ | 3-CH₃ | |
| i-C₄H₉ | 3-CH₃ | |
| C₅H₁₁ | 3-CH₃ | |
| C₆H₁₃ | 3-CH₃ | |
| Cyclopentyl | 3-CH₃ | |
| Cyclohexyl | 3-CH₃ | |
| 2-chloroethyl | 3-CH₃ | |
| H | 4-CH₃ | |
| CH₃ | 4-CH₃ | 109 to 110. |
| C₂H₅ | 4-CH₃ | |
| C₃H₇ | 4-CH₃ | |
| i-C₃H₇ | 4-CH₃ | 112 to 113. |
| C₄H₉ | 4-CH₃ | |
| i-C₄H₉ | 4-CH₃ | |
| sec-C₄H₉ | 4-CH₃ | |
| C₅H₁₁ | 4-CH₃ | |
| C₆H₁₃ | 4-CH₃ | |
| Cyclopentyl | 4-CH₃ | |
| Cyclohexyl | 4-CH₃ | |
| 2-chloroethyl | 4-CH₃ | |
| H | 4-F | 120 to 121. |
| CH₃ | 4-F | 79 to 80. |
| C₂H₅ | 4-F | 97 to 98. |
| C₃H₇ | 4-F | |
| i-C₃H₇ | 4-F | 95 to 96. |
| C₄H₉ | 4-F | |
| i-C₄H₉ | 4-F | |
| sec-C₄H₉ | 4-F | |
| C₅H₁₁ | 4-F | |
| C₆H₁₃ | 4-F | |
| Cyclopentyl | 4-F | |

TABLE—Continued

| R¹ | X | M.P. (°C.) |
|---|---|---|
| Cyclohexyl | 4-F | |
| 2-chloroethyl | 4-F | |
| H | 3-CF₃ | |
| CH₃ | 3-CF₃ | |
| C₂H₅ | 3-CF₃ | |
| C₃H₇ | 3-CF₃ | |
| i-C₃H₇ | 3-CF₃ | |
| C₄H₉ | 3-CF₃ | |
| i-C₄H₉ | 3-CF₃ | |
| sec-C₄H₉ | 3-CF₃ | |
| C₅H₁₁ | 3-CF₃ | |
| C₆H₁₃ | 3-CF₃ | |
| Cyclopentyl | 3-CF₃ | |
| Cyclohexyl | 3-CF₃ | |
| 2-chloroethyl | 3-CF₃ | |

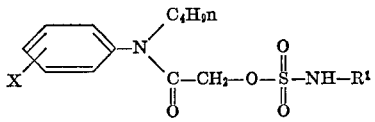

| R¹ | X | M.P. (°C.) |
|---|---|---|
| H | 2-CH₃ | |
| CH₃ | 2-CH₃ | |
| C₂H₅ | 2-CH₃ | |
| C₃H₇ | 2-CH₃ | |
| i-C₃H₇ | 2-CH₃ | |
| C₄H₉ | 2-CH₃ | |
| i-C₄H₉ | 2-CH₃ | |
| sec-C₄H₉ | 2-CH₃ | |
| C₅H₁₁ | 2-CH₃ | |
| C₆H₁₃ | 2-CH₃ | |
| Cyclopentyl | 2-CH₃ | |
| Cyclohexyl | 2-CH₃ | |
| 2-chloroethyl | 2-CH₃ | |

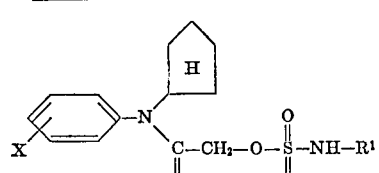

| R¹ | X | M.P. (°C.) |
|---|---|---|
| H | 2-CH₃ | |
| CH₃ | 2-CH₃ | |
| C₂H₅ | 2-CH₃ | |
| C₃H₇ | 2-CH₃ | |
| i-C₃H₇ | 2-CH₃ | 83 to 84. |
| C₄H₉ | 2-CH₃ | |
| i-C₄H₉ | 2-CH₃ | |
| sec-C₄H₉ | 2-CH₃ | |
| C₅H₁₁ | 2-CH₃ | |
| C₆H₁₃ | 2-CH₃ | |
| Cyclopentyl | 2-CH₃ | |
| Cyclohexyl | 2-CH₃ | |
| 2-chloroethyl | 2-CH₃ | |

| R¹ | X | Y | M.P. (°C.) |
|---|---|---|---|
| H | 2-CH₃ | 5-CH₃ | |
| CH₃ | 2-CH₃ | 5-CH₃ | |
| C₂H₅ | 2-CH₃ | 5-CH₃ | |
| C₃H₇ | 2-CH₃ | 5-CH₃ | |
| i-C₃H₇ | 2-CH₃ | 5-CH₃ | 129 to 130. |
| C₄H₉ | 2-CH₃ | 5-CH₃ | |
| i-C₄H₉ | 2-CH₃ | 5-CH₃ | |
| sec-C₄H₉ | 2-CH₃ | 5-CH₃ | |
| C₅H₁₁ | 2-CH₃ | 5-CH₃ | |
| C₆H₁₃ | 2-CH₃ | 5-CH₃ | |
| Cyclopentyl | 2-CH₃ | 5-CH₃ | |
| Cyclohexyl | 2-CH₃ | 5-CH₃ | |
| 2-chloroethyl | 2-CH₃ | 5-CH₃ | |
| H | 2-CH₃ | 6-CH₃ | |
| CH₃ | 2-CH₃ | 6-CH₃ | |
| C₂H₅ | 2-CH₃ | 6-CH₃ | |
| C₃H₇ | 2-CH₃ | 6-CH₃ | |
| i-C₃H₇ | 2-CH₃ | 6-CH₃ | |
| C₄H₉ | 2-CH₃ | 6-CH₃ | |
| i-C₄H₉ | 2-CH₃ | 6-CH₃ | |
| sec-C₄H₉ | 2-CH₃ | 6-CH₃ | |
| C₅H₁₁ | 2-CH₃ | 6-CH₃ | |
| C₆H₁₃ | 2-CH₃ | 6-CH₃ | |
| Cyclopentyl | 2-CH₃ | 6-CH₃ | |
| Cyclohexyl | 2-CH₃ | 6-CH₃ | |
| 2-chloroethyl | 2-CH₃ | 6-CH₃ | |

Analogous O-(aminosulfonyl)-glycolic anilides based on N-alkyl, N-alkenyl or N-alkinyl derivatives of 4-ethylaniline, 2-methyl - 6 - ethylaniline, 2,6-diethylaniline, 2-methyl - 6 - tert-butylaniline, 2-methyl-6-isopropylaniline, 2,6-diisopropylaniline, 3,5-dimethylaniline, 2,3-dimethylaniline, 3,4-dimethylaniline, 2,5-dimethylaniline, 3,5-bis-(trifluoromethyl)-aniline, 2-methyl - 6 - chloroaniline, 2-methyl-3-chloroaniline, 2-chloro-5-methylaniline, 2,5-dimethoxyaniline, 2,5 - diethoxyaniline, 2,4-dimethoxyaniline, 2 - chloro-4-methoxyaniline, 2,4,5-trimethylaniline, 2,4,6-trimethylaniline, and 2,5-dimethoxy-4-chloroaniline may be prepared similarly.

The new active ingredients have a strong herbicidal action and may therefore be employed as weed killers and for controlling the growth of unwanted plants. Whether the new active ingredients are used as total or selective agents depends in essence on the amount of ingredient used per unit area.

By "weeds" and "unwanted plant growth" we mean all monocotyledonous and dicotyledonous plants which grow in loci where they are not desired. The agents according to the invention may therefore be used for controlling for instance Gramineae, such as:

| | |
|---|---|
| Cynodon spp. | Dactylis spp. |
| Digitaria spp. | Avena spp. |
| Echinochloa spp. | Bromus spp. |
| Setaria spp. | Uniola spp. |
| Panicum spp. | Poa spp. |
| Alopecurus spp. | Leptochloa spp. |
| Lolium spp. | Brachiaria spp. |
| Sorghum spp. | Eleusine spp. |
| Agropyron spp. | Cenchrus spp. |
| Phalaris spp. | Eragrostis spp. |
| Apera spp. | etc.; |

Cyperaceae, such as

| | |
|---|---|
| Carex spp. | Elecoharis spp. |
| Cyperus spp. | etc.; |
| Scirpus spp. | | dicotyledonous weeds, such as

Malvaceae, e.g.,

| | |
|---|---|
| *Abutilon theoprasti* | Hibiscus spp. |
| Sida spp. | etc.; |
| Malva spp. | |

Compositae, such as

| | |
|---|---|
| Ambrosia spp. | Centaurea spp. |
| Lactuca spp. | Tussilago spp. |
| Senecio spp. | Lapsana communis |
| Sonchus spp. | Tagetes spp. |
| Xanthium spp. | Erigeron spp. |
| Iva spp. | Anthemis spp. |
| Galinsoga spp. | Matricaria spp. |
| Taraxacum spp. | Artemisia spp. |
| Chrysanthemum spp. | etc.; |
| Bidens spp. | |
| Cirisum spp. | |

Convolvulaceae, such as

| | |
|---|---|
| Convolvulus spp. | Cuscuta spp. |
| Ipomoea spp. | etc.; |
| *Jaquemontia tamnifolia* | |

Cruciferae, such as

| | |
|---|---|
| Barbarea vulgaris | Arabidopsis thaliana |
| Brassica spp. | Descurainia spp. |
| Capsella spp. | Draba spp. |
| Sisymbrium spp. | Coronopus didymus |
| Thlaspi spp. | Lepidium spp. |
| *Sinapos arvensis* | etc.; |
| Raphanus spp. | |

Geraniaceae, such as

| | |
|---|---|
| Erodium spp. | etc.; |
| Geranium spp. | |

Portulacaceae, such as

| | |
|---|---|
| Portulaca spp. | etc.; |

Primulaceae, such as

| | |
|---|---|
| *Anagallis arvensis* | etc.; |
| Lysimachia spp. | |

Rubiaceae, such as

| | |
|---|---|
| Richardia spp. | Diodia spp. |
| Galium spp. | etc.; |

Scrophulariaceae, such as

| | |
|---|---|
| Linaria spp. | Digitalis spp. |
| Veronica spp. | etc.; |

Solanaceae, such as

| | |
|---|---|
| Physalis spp. | Nicandra spp. |
| Solanum spp. | etc.; |
| Datura spp. | |

Urticaceae, such as

| | |
|---|---|
| Urtica spp. | etc.; |

Violaceae, such as

| | |
|---|---|
| Viola spp. | etc.; |

Zygophyllaceae, such as

| | |
|---|---|
| *Tribulus terrestis* | etc.; |

Euphorbiaceae, such as

| | |
|---|---|
| *Mercurialis annua* | Euphorbia spp. |

Umbelliferae, such as

| | |
|---|---|
| Daucus carota | *Ammi majus* |
| *Aethusa cyanpium* | etc.; |

Commelinaeae, such as

| | |
|---|---|
| Commelina spp. | etc.; |

Labiatae, such as

| | |
|---|---|
| Lamium spp. | etc.; |
| Galeopsis spp. | |

Leguminosae, such as

| | |
|---|---|
| Medicago spp. | *Sesbania exaltata* |
| Trifolium spp. | Cassia spp. |
| Vicia spp. | etc.; |
| Lathyrus spp. | |

Plantaginaceae, such as

| | |
|---|---|
| Plantago spp. | etc.; |

Polygonaceae, such as

| | |
|---|---|
| Polygonum spp. | Fagopyrum spp. |
| Rumex spp. | etc.; |

Aizoaceae, such as

| | |
|---|---|
| *Mollugo verticillata* | etc.; |

Amaranthaceae, such as

| | |
|---|---|
| Amaranthus spp. | etc.; |

Boraginaceae, such as

| | |
|---|---|
| Amsinckia spp. | Anchusa spp. |
| Myostis spp. | etc.; |
| Lithospermum spp. | |

Caryophyllaceae, such as

Stellaria spp.    Silene spp.
    Spergula spp.    Cerastium spp.
    Saponaria spp.    *Agrostemma githago*
    Scleranthus annuus    etc.;

Chenopodiaceae, such as

Chenopodium spp.    Atriplex spp.
    Kochia spp.    *Monolepsis nuttaliana*
    Salsola kali    etc.;

Lythraceae, such as

Cuphea spp.    etc.;

Oxalidaceae, such as

Oxalis spp.    etc.;

Ranunculaceae, such as

Ranunculus spp.    Adonis spp.
    Delphinium spp.    etc.;

Papaveraceae, such as

Papaver spp.    etc.;
    Fumaria officinalis

Onagraceae, such as

Jussiaea spp.    etc.;

Rosaceae, such as

Alchemillia spp.    etc.;
    Potentilla spp.

Potamogetonaceae, such as

Potamogeton spp.    etc.;

Najadaceae, such as

Najas spp.    etc.;

Marsileaceae, such as

Marsilea quadrifolia    etc.;

The amount used may vary and depends on the effect desired; it generally is from 0.1 to 15 or more and preferably from 0.2 to 6 kg. per hectare.

The new agents may be employed in cereal crops, such as

Avena spp.    Sorghum
    Triticum spp.    Zea mays
    Hordeum spp.    *Panicum miliaceum*
    Secale spp.    Oryza spp.

and in dicotyledon crops, such as

Cruciferae, e.g.

Brassica spp.    Raphanus spp.
    Sinapis spp.    Lepidium spp.

Compositae, e.g.

Lactuca spp.    Carthamus spp.
    Helianthus spp.    Scorzonera spp.

Malvaceae, e.g.

*Gossypium hirsutum*

Leguminosae, e.g.

Medicago spp.    Phaseolus spp.
    Trifolium spp.    Arachis spp.
    Pisum spp.    Glycine max.

Chenopodiaceae, e.g.

*Beta vulgaris*
    Spinacia spp.

Solanaceae, e.g.

Solanum spp.    *Capsicum annuum*
    Nicotiania spp.

Linaceae, e.g.

Linum spp.

Umbelliferae, e.g.

Petroselinum spp.    *Apium graveolens*
    Daucus carota

Rosaceae, e.g.

Fragaria

Cucurbitaceae, e.g.

Cucumis spp.    Cucurbita spp.

Liliaceae, e.g.

Allium spp.

Vitaceae, e.g.

Vitis vinifera

Bromeliaceae, e.g.

*Ananas sativus.*

Application may be effected for instance in the form of directly sprayable solutions, powders, suspensions, dispersions, emulsions, oil dispersions, pastes, dusts, or granules by spraying, atomizing, dusting, broadcasting or watering. The form of application depends entirely on the purpose for which the agents are being used; in any case it should ensure a fine distribution of the active ingredient.

For the preparation of solutions, emulsions, pastes and oil dispersions to be sprayed direct, mineral oil fractions of medium to high boiling point, such as kerosene or diesel oil, further coal-tar oils and oils of vegetable or mineral origin, aliphatic, cyclic and aromatic hydrocarbons such as benzene, toluene, xylene, paraffin, tetrahydronaphthalene, alkylated naphthalenes and their derivatives such as methanol, ethanol, propanol, butanol, chloroform, carbon tetrachloride, cyclohexanol, cyclohexanone, chlorobenzene, etc., and strongly polar solvents such as dimethylformamide, dimethyl sulfoxide, N-methylpyrrolidone, water, etc. are suitable.

Aqueous formulations may be prepared from emulsion concentrates, pastes, oil dispersions or wettable powders by adding water. To prepare emulsions, pastes and oil dispersions the ingredients as such or dissolved in an oil or solvent may be homogenized in water by means of wetting or dispersing agents, adherents or emulsifiers. Concentrates which are suitable for dilution with water may be prepared from active ingredient, wetting agent, adherent, emulsifying or dispersing agent and possibly solvent or oil.

Examples of surfactants are: alkali metal, alkaline earth metal and ammonium salts of ligninsulfonic acid, naphthalenesulfonic acids, phenolsulfonic acids, alkylaryl sulfonates, alkyl sulfates, and alkyl sulfonates, alkali metal and alkaline earth metal salts of dibutylnaphthalenesulfonic acid, lauryl ether sulfate, fatty alcohol sulfates, alkali metal and alkaline earth metal salts of fatty acids, salts of sulfated hexadecanols, heptadecanols, and octadecanols, salts of sulfated fatty alcohol glycol ether, condensation products of sulfonated naphthalene and naphthalene derivatives with formaldehyde, condensation products of naphthalene or naphthalenesulfonic acids with phenol and formaldehyde, polyoxyethylene octylphenol ethers, ethoxylated isooctylphenol, ethoxylated octylphenol and ethoxylated nonylphenol, alkylphenol polyglycol ethers, tributylphenyl polyglycol ethers, alkylaryl polyether alcohols, isotridecyl alcohol, fatty alcohol ethylene oxide condensates, ethoxylated castor oil, polyoxyethylene alkyl ethers, ethoxylated polyoxypropylene, lauryl alcohol polyglycol ether acetal, sorbitol esters, lignin, sulfite waste liquors and methyl cellulose.

Powders, dusts and broadcasting agents may be prepared by mixing or grinding the active ingredients with a solid carrier.

Granules, e.g., coated, impregnated or homogeneous granules, may be prepared by bonding the active ingredients to solid carriers. Examples of solid carriers are mineral earths such as silica gel, silicic acid, silicates, talc, kaolin, Attaclay, limestone, lime, chalk, bole, loess, clay, dolomite, diatomaceous earth, calcium sulfate, magnesium sulfate, magnesium oxide, ground plastics, fertilizers such as ammonium sulfate, ammonium phosphate, ammonium nitrate, and ureas, and vegetable products such as grain flours, bark meal, wood meal, and nutshell meal, cellulosic powders, etc.

The formulations contain from 0.1 to 95, and preferably 0.5 to 90% by weight of active ingredient.

There may be added to the compositions or individual active ingredients (if desired, immediately before use) oils of various types, herbicides, fungicides, nematocides, insecticides, bactericides, trace elements, fertilizers, antifoams (e.g., silicones), growth regulators, antidotes and other herbicidally effective compounds such as substituted anilines, substituted aryloxycarboxylic acids and salts, esters and amides thereof, substituted ethers, substituted arsonic acids and their salts, esters and amides, substituted benzimidazoles, substituted benzisothiazoles, substituted benzothiadiazinone dioxides, substituted benzoxazines, substituted benzoxazinones, substituted benzothiadiazoles, substituted biurets, substituted quinolines, substituted carbamates, substituted aliphatic carboxylic acids and their salts, esters and amides, substituted aromatic carboxylic acids and their salts, esters and amides, substituted carbamoylalkylthio or -dithiophosphates, substituted quinazolines, substituted cycloalkylamidocarbothiolic acids and their salts, esters and amides, substituted cycloalkylcarbonamidothiazoles, substituted dicarboxylic acids and their salts, esters and amides, substituted dihydrobenzofuranyl sulfonates, substituted disulfides, substituted dipyridylium salts, substituted dithiocarbamates, substituted dithiophosphoric acids and their salts, esters and amides, substituted ureas, substituted hexahydro-1-H-carbothioates, substituted hydantoins, substituted hydrazides, substituted hydrazonium salts, substituted isooxazole pyrimidones, substituted imidazoles, substituted isothiazole pyrimidones, substituted ketones, substituted naphthoquinones, substituted aliphatic nitriles, substituted aromatic nitriles, substituted oxadiazoles, substituted oxadiazinones, substituted oxadiazolidine diones, substituted oxadiazine diones, substituted phenols and their salts and esters, substituted phosphonic acids and their salts, esters and amides, substituted phosphonium chlorides, substituted phosphonalkylglycine, substituted phosphites, substituted phosphoric acids and their salts, esters and amides, substituted piperidines, substituted pyrazoles, substituted pyrazole alkylcarboxylic acids and their salts, esters and amides, substituted pyrazolium salts, substituted pyrazolium alkyl sulfates, substituted pyridazines, substituted pyridazones, substituted pyridine carboxylic acids and their salts, esters and amides, substituted pyridines, substituted pyridine carboxylates, substituted pyridinones, substituted pyrimidines, substituted pyrimidones, substituted pyrrolidine carboxylic acid and its salts, esters and amides, substituted pyrrolidines, substituted pyrrolidones, substituted arylsulfonic acids and their salts, esters and amides, substituted styrenes, substituted tetrahydrooxadiazine diones, substituted tetrahydrooxadiazole diones, substituted tetrahydromethanoindenes, substituted tetrahydrooxadiazole thiones, substituted tetrahydrothiadiazine thiones, substituted tetrahydrothiadiazole diones, substituted aromatic thiocarbonylamides, substituted aromatic thiocarbonylamides, substituted thiocarboxylic acids and their salts, esters and amides, substituted thiol carbamates, substituted thioureas, substituted thiophosphoric acids and their salts, esters and amides, substituted triazines, substituted triazoles, substituted uracils, substituted uretidine diones.

The last-mentioned herbicidal compounds may also be applied before or after the active ingredients or compositions thereof according to the invention.

These agents may be added to the herbicides according to the invention in a ratio by weight of from 1:10 to 10:1. The same applies to oils, fungicides, nematocides, insecticides, bactericides, antidotes and growth regulators.

The agents according to the invention may be applied either once or several times before or after planting, before sowing, pre- or postemergence, or during emergence of the crop plants or weeds.

EXAMPLE 2

In the greenhouse, loamy sandy soil was filled into pots and sown with Indian corn (*Zea mays*), cotton (*Gossypium hirsutum*), soybeans (*Soja hispida*), barnyardgrass (*Echinochloa crus-galli*), large crabgrass (*Digitaria sanguinalis*), foxtail types (Setaria spp.), meadow grass (*Poa trivialis*), Italian ryegrass (*Lolium multiflorum*), perennial ryegrass (*Lolium perenne*) and slender foxtail (*Alopecurus myosuroides*).

The soil prepared in this manner was then immediately treated with 1.5 kg. per hectare of each of the following active ingredients, each being dispersed or emulsified in 500 liters of water per hectare:

I O-(isopropylaminosulfonyl)-glycolic acid-N-ethyl-m-toluidide
II O-(methylaminosulfonyl)-glycolic acid-N-ethyl-m-toluidide
III O-(isopropylaminosulfonyl)-glycolic acid-N-methyl-2,5-dimethylanilide
IV O-(isopropylaminosulfonyl)-glycolic acid-N-ethyl-p-toluidide
VI O-(propylaminosulfonyl)-glycolic acid-N-ethyl-m-toluidide
VII O-(methylaminosulfonyl)-glycolic acid-N-isopropyl-p-toluidide
VIII O-(isopropylaminosulfonyl)-glycolic acid-N-isopropyl-p-toluidide
IX O-(methylaminosulfonyl)-glycolic acid-N-isopropyl-p-fluoroanilide
X O-(isopropylaminosulfonyl)-glycolic acid-N-isopropyl-p-fluoroanilide
XI O-(ethylaminosulfonyl)-glycolic acid-N-isopropyl-p-fluoroanilide
XII O-(propylaminosulfonyl)-glycolic acid-N-isopropyl-p-fluoroanilide
XIII O-(ethylaminosulfonyl)-glycolic acid-N-ethyl-m-toluidide
XIV O-(methylaminosulfonyl)-glycolic acid-N-methyl-o-methylanilide
XV O-(methylaminosulfonyl)-glycolic acid-N-methyl-p-methylanilide
XVI O-(methylaminosulfonyl)-glycolic acid -N-methyl-p-methylanilide
XVII O-(methylaminosulfonyl)-glycolic acid-N-methyl-m-chloroanilide
XVIII O-(ethylaminosulfonyl)-glycolic acid-N-methyl-p-methylanilide XIX O-(ethylaminosulfonyl)-glycolic acid-N-methyl-o-methylanilide
XX O-(ethylaminosulfonyl)-glycolic acid-N-methyl-p-methoxyanilide
XXI O-(ethylaminosulfonyl)-glycolic acid-N-methyl-m-chloroanilide
XXII O-(isopropylaminosulfonyl)-glycolic acid-N-methyl-p-methylanilide
XXIII O-(isopropylaminosulfonyl)-glycolic acid-N-methyl-o-methylanilide
XXIV O-(isopropylaminosulfonyl)-glycolic acid-N-methyl-p-methoxyanilide
XXV O-(isopropylaminosulfonyl)-glycolic acid-N-methyl-m-chloroanilide and, for comparison, V N-isopropyl-α chloroacetanilide.

After 3 to 4 weeks it was ascertained that active ingredients I to IV and VI to XXV had a better herbicidal action than comparative compound V, combined with the same or superior crop plant compatibility.

The results of this experiment are given in the table.

The action of O - (isopropylaminosulfonyl) - glycolic acid-N-cyclopentyl-o-toluidide corresponds to that of I to IV and VI to XXV in the above experiment.

EXAMPLE 3

In the greenhouse, the plants Indian corn (*Zea mays*), cotton (*Gossypium hirsutum*), soybeans, (*Soja hispida*), barnyard grass (*Echinochloa crus-galli*), large crabgrass (*Digitaria sanguinalis*), foxtail types (*Setaria* spp.), meadow grass (*Poa trivialis*), Italian ryegrass (*Lolium multiflorum*), perennial ryegrass (*Lolium perenne*) and slender foxtail (*Alopecurus myosuroides*) were treated at a growth height of from 2 to 15 cm. with 3 kg. per hectare of the following active ingredients, each being dispersed in 500 liters of water per hectare:

I O-(isopropylaminosulfonyl)-glycolic acid-N-ethyl-m-toluidide
II O-(methylaminosulfonyl)-glycolic acid-N-ethyl-m-toluidide
III O-(isopropylaminosulfonyl)-glycolic acid-N-methyl-2,5-dimethylanilide
V O-(methylaminosulfonyl)-glycolic acid-N-methyl-o-methylanilide
VI O-(methylaminosulfonyl)-glycolic acid-N-methyl-p-methylanilide
VII O-(methylaminosulfonyl)-glycolic acid-N-methyl-p-methoxyanilide
VIII O-(methylaminosulfonyl)-glycolic acid-N-methyl-m-chloroanilide
IX O-(ethylaminosulfonyl)-glycolic acid-N-methyl-p-methylanilide
X O-(ethylaminosulfonyl)-glycolic acid-N-methyl-o-methylanilide
XI O-(ethylaminosulfonyl)-glycolic acid-N-methyl-p-methoxyanilide
XII O-(ethylaminosulfonyl)-glycolic acid-N-methyl-m-chloroanilide
XIII O-(isopropylaminosulfonyl)-glycolic acid-N-methyl-p-methylanilide
XIV O-(isopropylaminosulfonyl)-glycolic acid-N-methyl-o-methylanilide
XV O-(isopropylaminosulfonyl)-glycolic acid-N-methyl-p-methoxyanilide
XVI O-(isopropylaminosulfonyl)-glycolic acid-N-methyl-m-chloroanilide and, for comparison, IV N-isopropyl-α-chloroacetanilide.

After 10 to 14 days it was ascertained that active ingredients I to III and V to XVI had a better herbicidal action than comparative compound IV, combined with superior crop plant compatibility.

| | I | II | III | IV | V | VI | VII | VIII | IX | X | XI | XII | XIII | XIV | XV | XVI | XVII | XVIII | XIX | XX | XXI | XXII | XXIII | XXIV | XXV |
|---|---|---|---|---|---|---|---|---|---|---|---|---|---|---|---|---|---|---|---|---|---|---|---|---|---|
| Crop plants: | | | | | | | | | | | | | | | | | | | | | | | | | |
| *Zea mays* | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| *Gossypium hirsutum* | 0 | 0 | 0 | 0 | 10 | 0 | 0 | 0 | 0 | 0 | 0 | 0 | 0 | 0 | 0 | 0 | 0 | 0 | 0 | 0 | 0 | 0 | 0 | 0 | 0 |
| *Soja hispida* | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| Unwanted plants: | | | | | | | | | | | | | | | | | | | | | | | | | |
| *Echinochloa crus-galli* | 100 | 100 | 95 | 80 | 70 | 95 | 95 | 80 | 100 | 100 | 95 | 85 | 100 | 100 | 85 | 95 | 100 | 85 | 85 | 85 | 90 | 90 | 85 | 80 | 85 |
| *Digitaria sanguinalis* | 100 | 95 | 90 | 80 | 65 | 90 | 90 | 85 | 95 | 95 | 95 | 95 | 95 | 100 | 85 | 90 | 95 | 90 | 90 | 85 | 85 | 95 | 85 | 75 | 85 |
| *Setaria* spp. | 100 | 85 | 90 | 80 | 50 | 85 | 80 | 85 | 100 | 95 | 95 | 95 | 90 | 95 | 85 | 90 | 100 | 85 | 95 | 95 | 90 | 85 | 90 | 85 | 100 |
| *Poa trivialis* | 95 | 90 | 80 | 80 | 35 | 85 | 90 | 85 | 95 | 90 | 95 | 90 | 95 | 95 | 95 | 90 | 95 | 85 | 90 | 90 | 95 | 95 | 95 | 90 | 95 |
| *Lolium multiflorum* | 100 | 85 | 80 | 80 | 40 | 95 | 95 | 85 | 95 | 90 | 90 | 95 | 95 | 95 | 90 | 95 | 95 | 90 | 95 | 90 | 90 | 95 | 85 | 90 | 95 |
| *Lolium perenne* | 95 | 80 | 90 | 80 | 40 | 95 | 85 | 85 | 100 | 95 | 95 | 90 | 95 | 95 | 90 | 95 | 95 | 95 | 90 | 90 | 95 | 95 | 90 | 95 | 95 |
| *Alopecurus myosuroides* | 90 | 80 | 90 | 80 | 40 | 95 | 85 | 85 | 100 | 95 | 95 | 90 | 95 | 95 | 90 | 95 | 95 | 95 | 90 | 90 | 90 | 95 | 90 | 95 | 95 |

0=no damage.
100=complete destruction.

The results of this experiment are given below:

|  | I | II | III | IV | V | VI | VII | VIII | IX | X | XI | XII | XIII | XIV | XV | XVI |
|---|---|---|---|---|---|---|---|---|---|---|---|---|---|---|---|---|
| Crop plants: |  |  |  |  |  |  |  |  |  |  |  |  |  |  |  |  |
| Zea mays | 0 | 0 | 0 | 10 | 0 | 0 | 0 | 0 | 0 | 0 | 0 | 0 | 0 | 0 | 0 | 0 |
| Gossypium hirsutum | 5 | 0 | 0 | 40 | 0 | 0 | 0 | 0 | 0 | 0 | 0 | 0 | 0 | 0 | 0 | 0 |
| Soja hispida | 5 | 0 | 0 | 20 | 0 | 0 | 0 | 0 | 0 | 0 | 0 | 0 | 0 | 0 | 0 | 0 |
| Unwanted plants: |  |  |  |  |  |  |  |  |  |  |  |  |  |  |  |  |
| Echinochloa crus-galli | 100 | 100 | 95 | 50 | 75 | 60 | 70 | 80 | 80 | 65 | 70 | 65 | 70 | 70 | 70 | 75 |
| Digitaria sanguinalis | 100 | 100 | 95 | 45 | 70 | 65 | 75 | 80 | 75 | 65 | 65 | 60 | 70 | 70 | 75 | 70 |
| Setaria spp | 100 | 95 | 90 | 40 | 70 | 65 | 75 | 80 | 75 | 60 | 65 | 65 | 65 | 70 | 80 | 70 |
| Poa trivialis | 100 | 100 | 90 | 40 | 85 | 75 | 80 | 75 | 80 | 70 | 75 | 70 | 75 | 75 | 85 | 85 |
| Lolium multiflorum | 100 | 95 | 90 | 30 | 80 | 75 | 75 | 75 | 70 | 70 | 75 | 70 | 80 | 75 | 80 | 85 |
| Lolium perenne | 100 | 100 | 95 | 35 | 80 | 70 | 75 | 80 | 70 | 75 | 70 | 70 | 80 | 80 | 80 | 85 |
| Alopecurus myosuroides | 100 | 95 | 90 | 40 | 70 | 70 | 75 | 75 | 70 | 70 | 75 | 75 | 80 | 75 | 85 | 80 |

0=no damage.
100=complete destruction.

The action of O-(isopropylaminosulfonyl-glycolic acid-N-ethyl-p-toluidide and O-(isopropylaminosulfonyl) - glycolic acid-N-cyclopentyl-o-toluidide corresponds to that of I to III and V to XVI in the above experiment.

EXAMPLE 4

90 parts by weight of compound I is mixed with 10 parts by weight of N-methyl-α-pyrrolidone. A mixture is obtained which is suitable for application in the form of very fine drops.

EXAMPLE 5

20 parts by weight of compound II is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of compound III is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of compound I is dissolved in a mixture consisting of 25 parts by weight of cyclohexanol, 65 parts by weight of a mineral oil fraction having a boiling point betwen 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 8

20 parts by weight of compound II is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 9

3 parts by weight of compound III is intimately mixed with 97 parts by weight of particulate kaolin. A dust is obtained containing 3% by weight of the active ingredient.

EXAMPLE 10

30 parts by weight of compound I is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A substituted O-(aminosulfonyl)-glycolic anilide of the formula

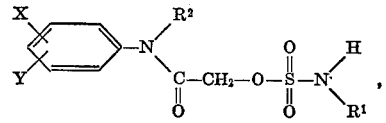

wherein $R^1$ denotes hydrogen, alkyl or haloalkyl of 1 to 6 carbon atoms, cyclo/pentyl or cyclohexyl, $R^2$ denotes alkyl of 1 to 6 carbon atoms, cyclopentyl or cyclohexyl, X denotes hydrogen, halogen, alkyl, haloalkyl or alkoxy of 1 to 6 carbon atoms, Y denotes hydrogen or alkyl of 1 to 6 carbon atoms, with the proviso that both X and Y cannot denote hydrogen.

2. The compound of claim 1 which is O-(methylaminosulfonyl)-glycolic acid-N-ethyl-m-toluidide.

3. The compound of claim 1 which is O-(ethylaminosulfonyl)-glycolic acid-N-ethyl-m-toluidide.

4. The compound of claim 1 which is O-(propylaminosulfonyl)-glycolic acid-N-ethyl-m-toluidide.

5. The compound of claim 1 which is O-(isopropylaminosulfonyl)-glycolic acid-N-ethyl-m-toluidide.

6. The compound of claim 1 which is O-(isopropylaminosulfonyl)-glycolic acid-N-ethyl-p-toluidide.

7. The compound of claim 1 which is O-(methylaminosulfonyl)-glycolic acid-N-isopropyl-p-toluidide.

8. The compound of claim 1 which is O-(isopropylaminosulfonyl)-glycolic acid-N-isopropyl-p-toluidide.

9. The compound of claim 1 which is O-(methylaminosulfonyl)-glycolic acid-N-isopropyl-p-fluoroanilide.

10. The compound of claim 1 which is O-(ethylaminosulfonyl)-glycolic acid-N-isopropyl-p-fluoroanilide.

11. The compound of claim 1 which is O-(propylaminosulfonyl)-glycolic acid-N-isopropyl-p-fluoroanilide.

12. The compound of claim 1 which is O-(isopropylaminosulfonyl)-glycolic acid-N-isopropyl-p-fluoroanilide.

13. The compound of claim 1 which is O-(isopropylaminosulfonyl)-glycolic acid-N-cyclopentyl-o-toluidide.

14. The compound of claim 1 which is O-(isopropylaminosulfonyl)-glycolic acid-N-methyl - 2,5-dimethylanilide.

15. The compound of claim 1 which is O-(methylaminosulfonyl)-glycolic acid-N-methyl-o-methylanilide.

16. The compound of claim 1 which is O-(methylaminosulfonyl)-glycolic acid-N-methyl-p-methylanilide.

17. The compound of claim 1 which is O-(methylaminosulfonyl)-glycolic acid-N-methyl-p-methoxyanilide.

18. The compound of claim 1 which is O-(methylaminosulfonyl)-glycolic acid-N-methyl-m-chloroanilide.

19. The compound of claim 1 which is O-(ethylaminosulfonyl)-glycolic acid-N-methyl-p-methylanilide.

20. The compound of claim 1 which is O-(ethylaminosulfonyl)-glycolic acid-N-methyl-o-methylanilide.

21. The compound of claim 1 which is O-(ethylaminosulfonyl)-glycolic acid-N-methyl-p-methoxyonilide.

22. The compound of claim 1 which is O-(ethylaminosulfonyl)-glycolic acid-N-methyl-m-chloroanilide.

23. The compound of claim 1 which is O-(isopropylaminosulfonyl)-glycolic acid-N-methyl-p-methylanilide.

24. The compound of claim 1 which is O-(isopropylamino sulfonyl)-glycolic acid-N-methyl-o-methylanilide.

25. The compound of claim 1 which is O-(isopropylaminosulfonyl)-glycolic acid-N-methyl-p-methoxyanilide.

26. The compound of claim 1 which is O-(isopropylaminosulfonyl)-glycolic acid-N-methyl-m-chloroanilide.

References Cited

UNITED STATES PATENTS

| | | | |
|---|---|---|---|
| 3,536,721 | 10/1970 | Soong, et al. | 260—456 A |
| 3,383,195 | 5/1968 | Drummond et al. | 71—103 |
| 3,082,238 | 3/1963 | Dunbar | 260—456 A |
| 3,687,998 | 8/1972 | Trepka | 260—456 A |
| 3,423,470 | 1/1969 | Rohr et al. | 71—103 |
| 3,367,949 | 2/1968 | Soper | 71—103 |

FOREIGN PATENTS

| | | | |
|---|---|---|---|
| 768,194 | 2/1957 | Great Britain | 260—456 A |

BERNARD HELFIN, Primary Examiner

N. CHAN, Assistant Examiner

U.S. Cl. X.R.

71—103